(Model.) 8 Sheets—Sheet 1.

W. N. WHITELEY & R. BROWN.
GRAIN BINDER.

No. 377,093. Patented Jan. 31, 1888.

(Model.)  8 Sheets—Sheet 5.

W. N. WHITELEY & R. BROWN.
GRAIN BINDER.

No. 377,093.  Patented Jan. 31, 1888.

Attest
J. C. Turner
Aug. Jordan

Inventors
Wm. N. Whiteley
Robert Brown (Model.) 8 Sheets—Sheet 6.
W. N. WHITELEY & R. BROWN.
GRAIN BINDER.

No. 377,093. Patented Jan. 31, 1888.

(Model.) 8 Sheets—Sheet 7.

W. N. WHITELEY & R. BROWN.
GRAIN BINDER.

No. 377,093. Patented Jan. 31, 1888.

Witnesses:
J. B. McGirr.
R. W. Smith.

Inventor:
W. N. Whiteley & Robt Brown,
By their Atty (Model.) 8 Sheets—Sheet 8.

W. N. WHITELEY & R. BROWN.
GRAIN BINDER.

No. 377,093. Patented Jan. 31, 1888.

UNITED STATES PATENT OFFICE.

WILLIAM N. WHITELEY AND ROBERT BROWN, OF SPRINGFIELD, OHIO, ASSIGNORS TO WHITELEY, FASSLER & KELLY, OF SAME PLACE.

GRAIN-BINDER.

SPECIFICATION forming part of Letters Patent No. 377,093, dated January 31, 1888.

Application filed May 4, 1882. Serial No. 60,418. (Model.)

*To all whom it may concern:*

Be it known that we, WILLIAM N. WHITELEY and ROBERT BROWN, of Springfield, county of Clark, State of Ohio, have invented new and useful Improvements in Grain-Binders, of which the following is a specification.

In the accompanying drawings.

Letters of like character represent corresponding parts in each of the figures.

Our invention relates to self-binders that automatically compact the grain into sheaves of uniform diameter and encircle them with a band, the ends of which they securely tie, then eject the bound sheaf from the binding-table to the ground without the aid of manual labor; and it consists in the construction and arrangement of the parts and devices, as will be hereinafter fully described.

To enable those skilled in the art to which our invention belongs, to construct and operate a machine according to our invention, we will now describe its construction and mode of operation.

The binding mechanism is mounted on any suitable frame, $a$, and may be made adjustable to suit the varying lengths of straw by any of the well-known devices in use for that purpose.

As fast as the grain is deposited upon the binding-table $b$ by the harvesting-machine, a series of packers, $c\ c'$, take hold of it and compact it against a bifurcated trip-arm, $d$. The trip-arm $d$ is fast to a shaft, $e$, that is loosely journaled in bearings $f\ f$, an extension, $g$, which is straddled by said arm $d$, fits loosely on the shaft $e$, and is held up to the position indicated in the drawings by means of an arm, $h$, that is rigidly attached to the shaft $e$. The arm $h$ is provided with a pin, $i$, that passes through a slot, $j$, made in the piece $g$, and by this means the pieces $g$ and $h$ are coupled together. The arm $h$ is held in the position shown through the agency of a bell-crank, $k$, that is journaled to the main frame $a$.

To hold the bell-crank $k$ up to its work, we employ a strap, $l$, provided with a spring-latch, $m$, that engages with a notch, $n$, formed on a metal slideway that is firmly secured to the main frame $a$. The trip-arm $d$ is held up to its work by a spring, $p$, that rests upon the piece $g$, and the accumulation of grain against the arm $d$, through the agency of the packers $c\ c'$, overcomes the resistance of the spring $p$ and rocks the shaft $e$. The shaft $e$ is provided with an arm, $q$, to which is connected an adjustable plate, $r$, that has a cam, $t$, projecting from one of its sides. This cam engages with a hooked rod, $u$, that actuates the device we use to couple the binding mechanism to the continuously-running harvester.

This coupling device consists of what may be termed a "pivoted" tooth, $v$, on the main wheel $w$, and a sliding pin, $x$, working through the frame $y$, to which the wheel $w$ is journaled. The tooth $v$ is pivoted to the gear-wheel $w$ at $a'$, and when it is liberated by the withdrawal of the pin $x$, in the manner hereinafter specified, it is forced into the path of the continuously-running pinion $b'$ through the agency of a spring, $d'$, thereby causing the wheel $w$ to advance past the gap made in its teeth and to be brought properly into mesh with the pinion $b'$, and thus cause a union of the harvesting and binding mechanism.

To limit the movement of the pivoted tooth $v$, we employ a projection, $e'$, that rests against the rim $f'$ of the wheel $w$ when the spring $d'$ has forced it to that position. The hooked rod $u$ is provided with a cam-shaped slot, $h'$, through which the pin $q'$ of the sliding pin $x$ passes for the purpose of withdrawing said pin from the notch $k'$ of the pivoted tooth $v$.

Before the machine is put into practical use it should be supplied with twine, one end of which is threaded through the binding-arm and then delivered to the cord-holder in the usual manner.

As the binding mechanism is put into motion, in the manner above specified, the packers $c\ c'$ are thrown out of operation by means of a clutch, $r'\ r^6$, the part $r'$ being fast on the shaft $h^5$ and the part $r^6$ being longitudinally movable thereon and actuated by a cam, $t'$, fast to the shaft $u'$, and a pivoted clutch-lever, $v'$, attached to the main frame $a$. The clutch-lever $v'$ is kept against the face of the cam $t'$ by a coil-spring, $w'$, which also serves to throw said clutch into gear again at the termination of the return-stroke of the binding-arm.

The upward movement of the binding-arm $y'$ is attained through the agency of a crank-arm, $a^2$, fast to the binding-arm shaft, and an adjustable rod, $b^2$, that connects said crank-arm with the main gear-wheel $w$ at $c^2$. As the binding-arm ascends to encircle the sheaf with twine and assist in its compression, a simultaneous upward movement of the ejectors $d^2\ d^2\ d^2$ takes place through the agency of a crank-arm, $e^2$, fast to the shaft $f^2$, on which said ejectors are arranged and to which they are secured, and a rod, $g^2$, that connects the crank-arms $a^2$ and $e^2$. The ejectors $d^2$ are composed of three pieces hinged together at $h^2$ and at $k^2$, so that they may pass backward uninterruptedly over the grain about to be bound to a position suitable for its subsequent ejectment. The joint at $h^2$ permits of a limited movement of the part $l^2$, and the joint or hinge at $k^2$ is provided with a coil-spring, which returns the part $m^2$ to a position almost at right angles to the part $l^2$. The binding-arm $y'$, after completing the encircling of the sheaf with twine, delivers the other end of the band material to the combined cord cutter and holder $n^2$, whereby the band is cut loose from the supply and the first end released from the cord-holder $n^2$, which takes a new grip upon the end of the band material leading to the cord-box. Simultaneous with or slightly in advance of this movement of the holder and cutter $n^2$ the looping-hook $p^2$ of the knotter $q^2$ has taken hold of both ends of the band that now encircles the sheaf, and the knot is then made in the manner hereinafter specified.

The combined cord cutter and holder $n^2$ differs from others now in use in the following manner: The movable cutter-blade $r^2$ and the bar $t^2$ of the holder have a positive reciprocatory movement derived from a cam, $u^2$, a pivoted lever, $v^2$, and a connecting-rod, $w^2$, and the seat $c^3$ offers a yielding resistance, due to the spring $a^3$ and pin $b^3$, forming a part of the seat $c^3$, by which arrangement we obtain a more satisfactory combined cord cutting and holding device. The cutter-blade is provided with elongated holes $d^3$ and holding-screws, so that it may be adjusted to compensate for wear, and the spring $a^3$ is secured to the bracket $a^{\times}$, that is fast to the frame $a$.

Our knotter differs from other knotters of the class known as "cylinder" knotters in the following manner: Its looping-hook $p^2$ makes two revolutions for each knot that is tied, one and one-half revolution to wind the strands of the cord around an intermediate tube, $e^3$, and make the crossing necessary to form the knot, and then a rest while the knot is being completed, and one-half of a revolution farther on to bring the looping-hook $p^2$ to same place of rest prior to the formation of another sheaf. With this arrangement and construction the knotter-pinion $f^3$ may be made small and compact, and its delay-shoes $g^3$ may be made to assist in holding said pinion either in or out of gear by engaging the plane surface $y^3$ or $v^3$, as the case may be. It is obvious that this construction and arrangement can be changed somewhat without departing from the spirit of our invention—for instance, the looping-hook $p^2$ may come to a temporary rest after making about one and one-third of a revolution, and then complete its travel of two revolutions; but of course this would not be as compact as the other construction.

Figure 9:
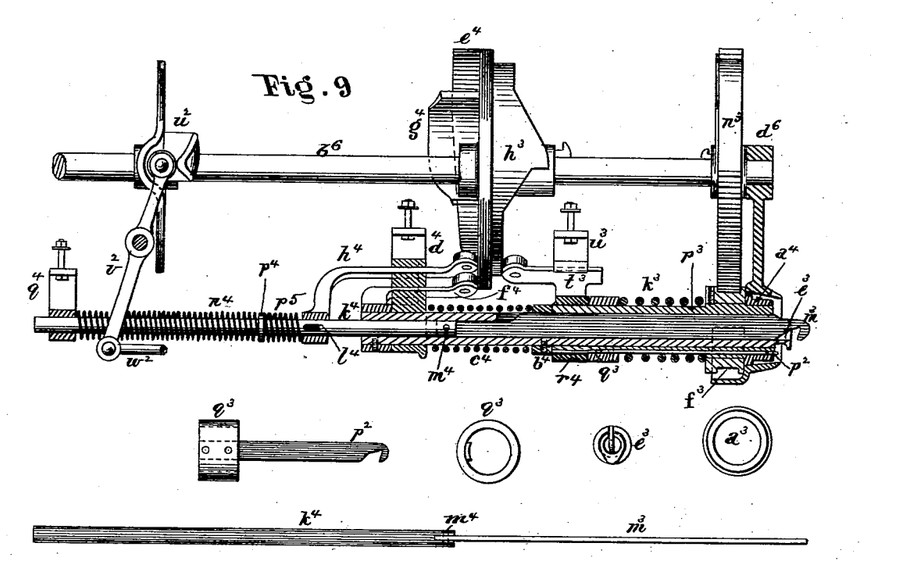
Fig. 9 is a view of the knotter and its actuating mechanism, shown part in elevation and part in section in order that it may be better understood.
Figure 10:
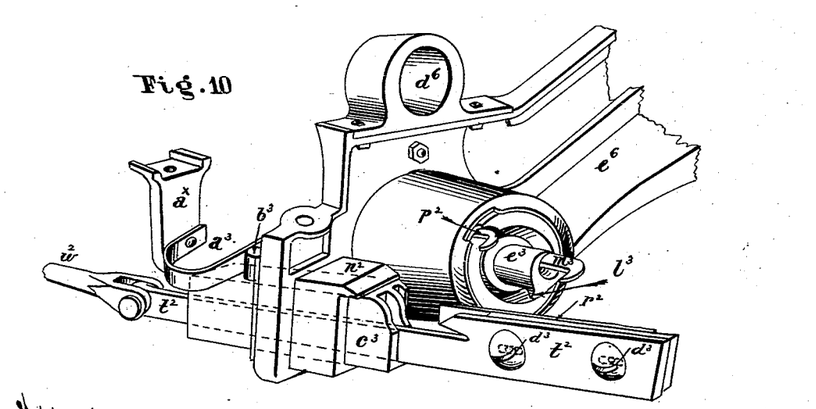
Fig. 10 is a perspective view of the knotting and gripping devices.
Figures 11, 12, 13, 14:
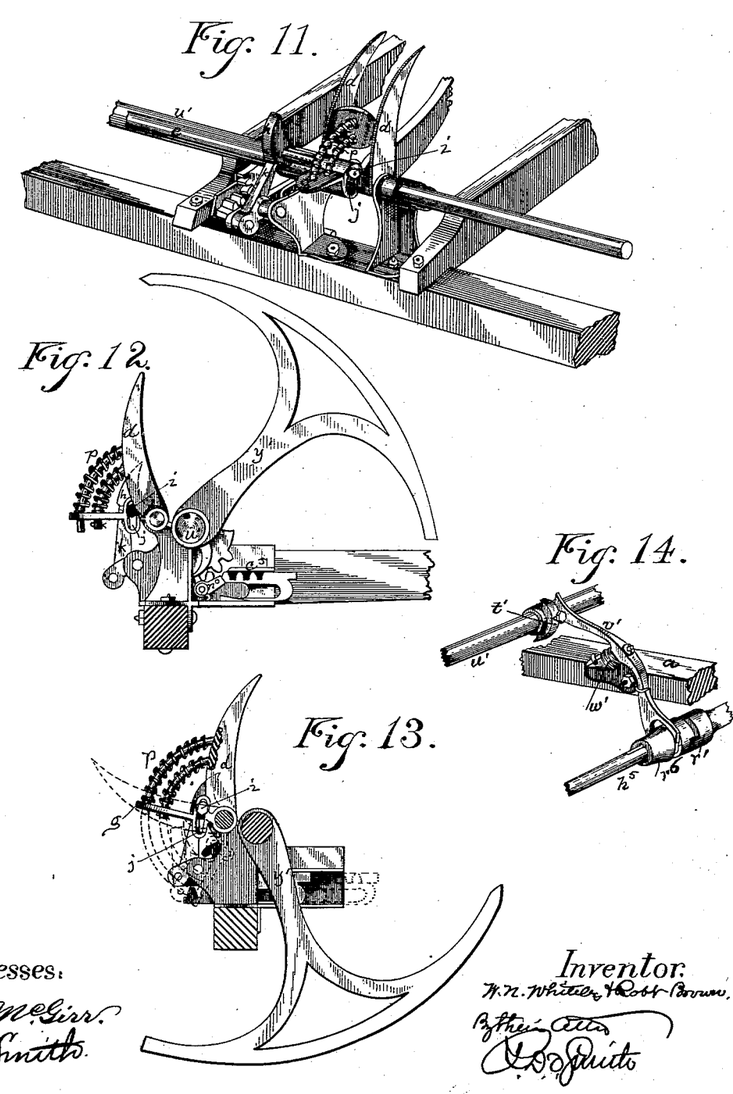
Fig. 11 is a perspective view of the compressor and trip.
Fig. 12 is a side elevation of the same.
Fig. 13 is a similar elevation with parts in another position.
Fig. 14 is a perspective view of the automatic clutch-lever.
Figure 15:
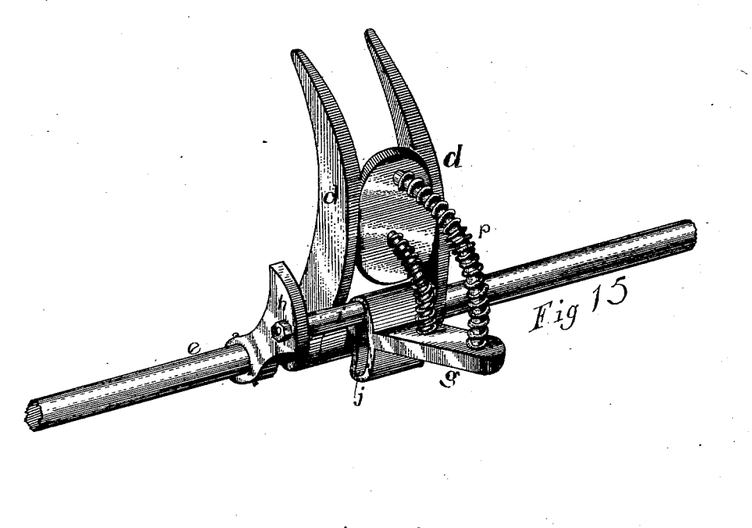
Fig. 15 is a perspective view of the compressor and attachments.
Figure 16:
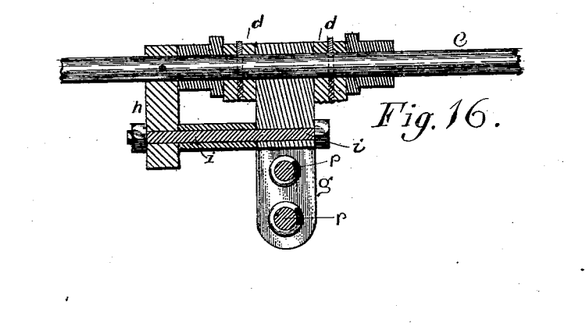
Fig. 16 is a longitudinal axial section of the same.

The jaw of the cord-holder $n^2$ is opened by the cam $u^2$, in the manner illustrated by Figs. 9 and 10 of the drawings, and the end of the band material that it previously held is thereby released, and the holder-jaw almost instantly closed again by the continued revolution of said cam $u^2$, and the band now around the sheaf is severed from the band material by the knife $r^2$, and the parts $t^2$ and $c^3$ get a new grip upon the band material. While this is being accomplished, or, rather, slightly previous thereto, the looping-hook $p^2$ has been pressed out by the cam $h^3$ and forced back again by the coil-spring $k^3$, by which operation both ends of the cord have been grasped by said hook, which is now rotated one and one-half revolution for the purpose of forming the loop of the knot around the tube $e^3$ and crossing the ends over the end of the tube, necessary to the formation of a knot. During the latter portion of this rotary movement of the looping-hook $p^2$, the tube $e^3$ retreats into the cylinder of said knotter, and with the aid of a spur, $l^3$, carries the loop of the knot with it, permitting the looper with the ends of the band to deliver them across the end of the tube to the inside hook, $m^3$, which retreats with them into the tube $e^3$, and the continued retreat of the tube $e^3$, aided by the resistance of the sheaf, slips the loop of the knot over the ends held by the hook $m^3$, which completes the knot, and the hook $m^3$ will then advance to drop the knot. The tube $e^3$ and hook $m^3$ have no rotary motion, simply a longitudinally-reciprocating movement; but the looping-hook $p^2$ has a rotary as well as a longitudinally-reciprocating movement.

The wheel $n^3$, that rotates the looper $p^2$, has two distinct sets of teeth around its periphery, the set having the greater number being first brought into gear with the pinion $f^3$. The pinion $f^3$ is fast to the tube $p^3$, and the looping-hook $p^2$ fits loosely into a longitudinal groove that is formed in said tube. The looper $p^2$ is secured to a ring, $q^3$, that fits loosely over the tube $p^3$, and the spring $k^3$, bearing against said ring on one side and the pinion $f^3$ on the other, keeps the ring $q^3$ against the cylindrical bearing $r^3$ of the slide $t^3$, that is actuated by a cam, $h^3$. The slide $t^3$ works through a stationary guide, $u^3$, that is made fast to the frame $a$. The teeth on the wheel $n^3$, first brought into mesh with the pinion $f^3$, are seventeen in number, while the pinion $f^3$ has but twelve teeth. Consequently said pinion is rotated one and a half time around the pinion, then rests while the plain surface $y^3$ is passing over one of the delay-shoes $g^3$ on the pinion $f^3$, after which the five teeth $w^3$ engage with it and move it one-half of a revolution, and the plain surface $v^3$ engages with the other of the delay-shoes $g^3$, and the looper $p^2$ comes to rest after making just two revolutions. A ring, $a^4$, fits tightly over the end of the tube $p^3$ and forms a seat for the looper-hook $p^2$. The tube $e^3$ fits loosely in the tube $p^3$, in which it has a longitudinally-reciprocating movement. It is provided with a tight ring, $b^4$, that rests against one end of the tube $p^3$. It is also provided with a spring, $c^4$, one end of which rests against the ring $b^4$, while the other end rests against the guide or bracket $d^4$, that is fast to the frame $a$. The tube $e^3$ receives its longitudinal movement from a cam, $e^4$, through the agency of an arm, $f^4$, that slides through the guide $d^4$, one end of which is fast to said tube while the other rides against the cam $e^4$. The spring $c^4$ serves to keep the arm $f^4$ against the cam $e^4$.

The hook $m^3$ receives its longitudinal movement from a cam, $g^4$, through the agency of an arm, $h^4$, which slides through the guide $d^4$, one end of which rides against said cam while the other is attached to a rod, $k^4$, by means of a slot and pin, $l^4$. The rod $k^4$ is coupled to the hook $m^3$ at $m^4$. A spring, $n^4$, one end of which rests against a fixed collar, $p^4$, while the other rests against the stationary bearing $q^4$, is used to keep the arm $h^4$ against the cam $g^4$, the intermediate spring $p^5$ and slot $l^4$ being used to permit the hook $m^3$ to yield when overtaxed. The sheaf having been properly bound, the binding-arm descends below the binding-table, and during its descension it carries with it a pivoted lever, $u^4$, which will come in contact with a latch, $m$, and lift it from the notch $n$, thus permitting the rod $l$ to move back in the slot $v^4$, also causing the bell-crank $k$ to fall from under the support $h$ of the trip-arm $d$ and the ejectors $d^2$, which had previously assumed a position at the back of the sheaf in the manner above described, to advance and force the sheaf from the binding-table and the trip-arm $d$ to fall out of the way of the passage of said sheaf. As the plate $r$ and trip-arm $d$ are both secured to the shaft $e$, and the motion of the plate $r$ in consequence thereof is greater than is necessary for the proper working of the starting-rod $u$, said starting-rod is so shaped as to slip from the end of the projection $t$ to the curved and extended face thereof, and the spring $a^5$ returns it to its place of rest, at the same time causing the pin $x$ to protrude into the path of the pivoted tooth $v$, ready to arrest it when it shall have arrived at that point, and thus throw the wheel $w$ out of mesh with the pinion $b'$, to await the accumulation of another sheaf of the required size. After the bound sheaf has been ejected from the machine, and the binding-arm continues to descend to its position of rest below the binding-table, the rack $b^5$, which is attached to the same shaft $u'$ that actuates the binding-arm, moves the rack $c^5$, in which the slot $v^4$ is formed, and the rod $l$, the end of which slides in said slot, is carried down with the rack, causing the bell-crank $k$ to raise the lever $h$ and the trip $d$ to their positions of rest, with the spring-latch $m$ resting against the shoulder $n$ and the pivoted spring-lever $u^4$ occupying a place between said latch and the trip arm $d$. As the trip-arm comes to its place of rest, the cam $t'$ permits the spring $w'$ to move the lever $v'$ so as to throw the clutch $r'$ into gear and start the packers $c$ $c'$. The packers $c'$ $c'$ move on coincident cranks $d^5$, while the packer $c$ moves on a crank, $e^5$, directly the opposite of $d^5$. Consequently while the packers $c'$ are moving forward the packer $c$ must be moving backward. These packers are confined in their course of travel by stationary studs $f^5$, that work in slots $g^5$ formed in said packers, and the cranks that give them motion are actuated by a shaft, $h^5$, fast to a pinion, $k^5$.

To confine loose and scattering grain to the binding-table we employ two pivoted levers, $l^5$, one on each side of the binding-arm. These levers are moved up and down with the trip-arm $d$ through the agency of arms $m^5$, which are fast upon the same shaft as said trip-arm. The lugs $n^5$, by means of holes through which the lower parts of the levers $l^5$ move, confine said levers to a desired course of travel.

The spring-rods $p^6$ and sheet-metal deflector $q^5$ are used to confine and straighten up the grain on its way to the compress. The spring-arm $r^5$ is the take-up used in conjunction with any tension device to preserve a taut cord from the cord-supply to the cord-holder $n^2$.

The cams and gear-wheels that actuate the knotter receive their motion from the pinion $t^5$, which will be held in a state of rest while its delay-piece $u^5$ rides upon the concentric ring $v^5$, formed on the wheel $w$, and as the delay $u^5$ falls into the gap $w^5$ the pinion is revolved by the segment of teeth $y^5$. When the gap $a^6$ is reached, the delay $u^5$ will slide upon the ring $v^5$ in the usual manner.

The gear-wheel $w$ is journaled in a metal frame, $y$, that joins the main frame $a$.

Figure 1:
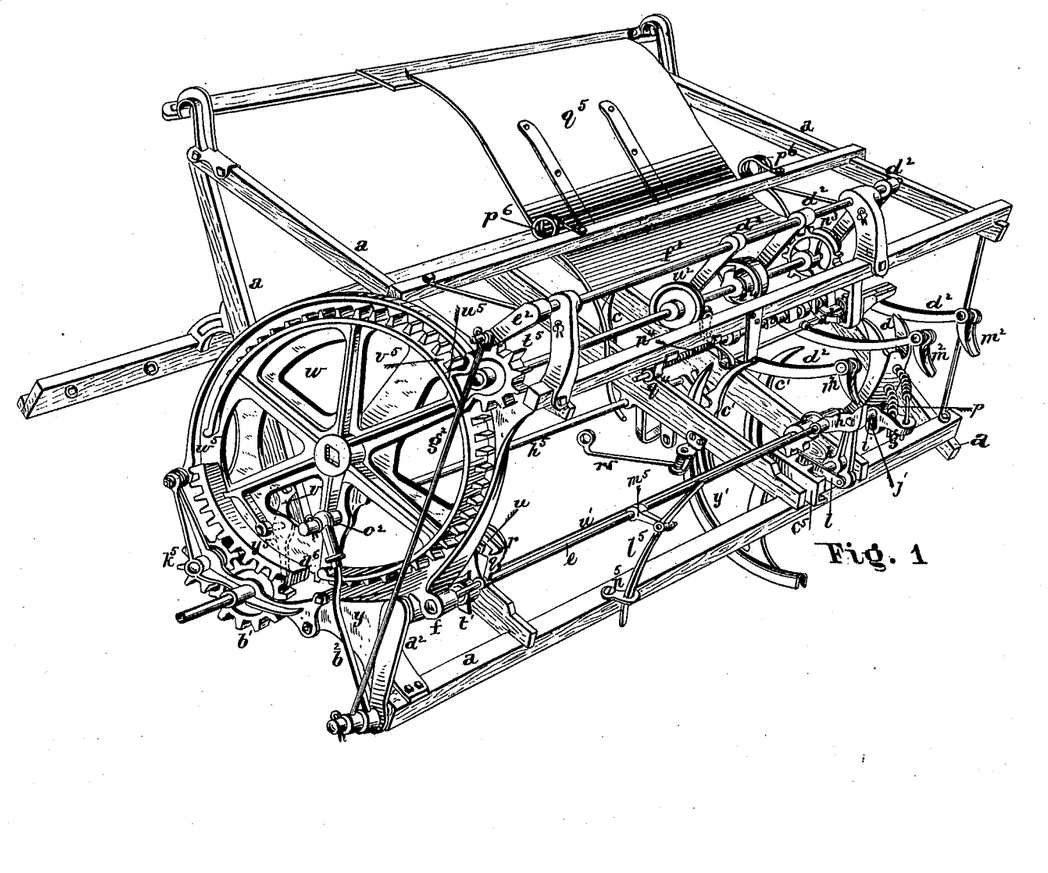
Figure 1 is a perspective view of a self-binder embodying our improvements.
Figures 2, 3:
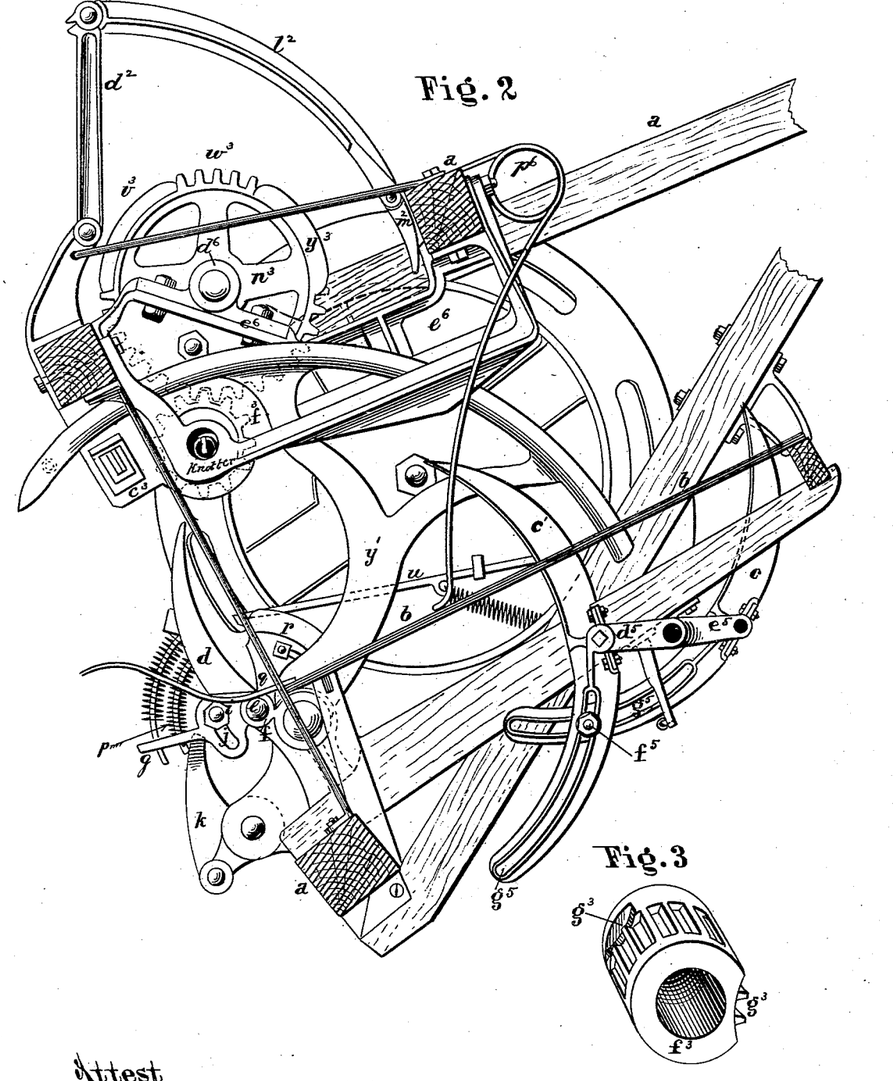
Fig. 2 is an end elevation of the same.
Fig. 3 is a perspective view of the knotter-pinion.
Figure 4:
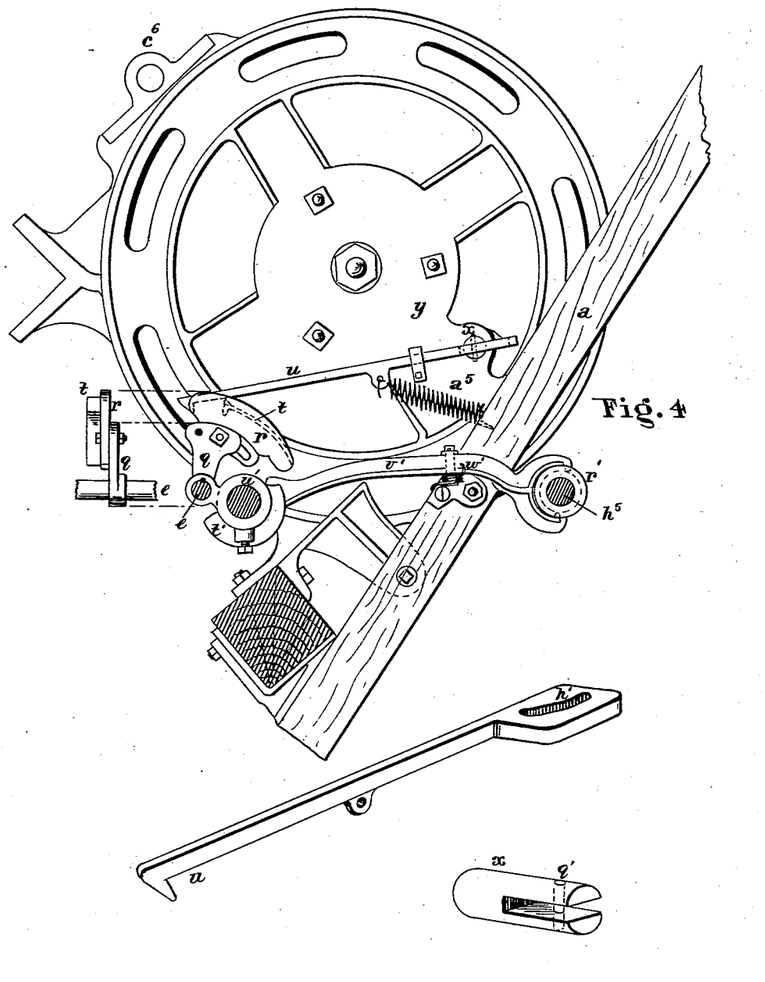
Figs. 4 and 5 are end elevations of the starting mechanism.
Figures 5, 6:
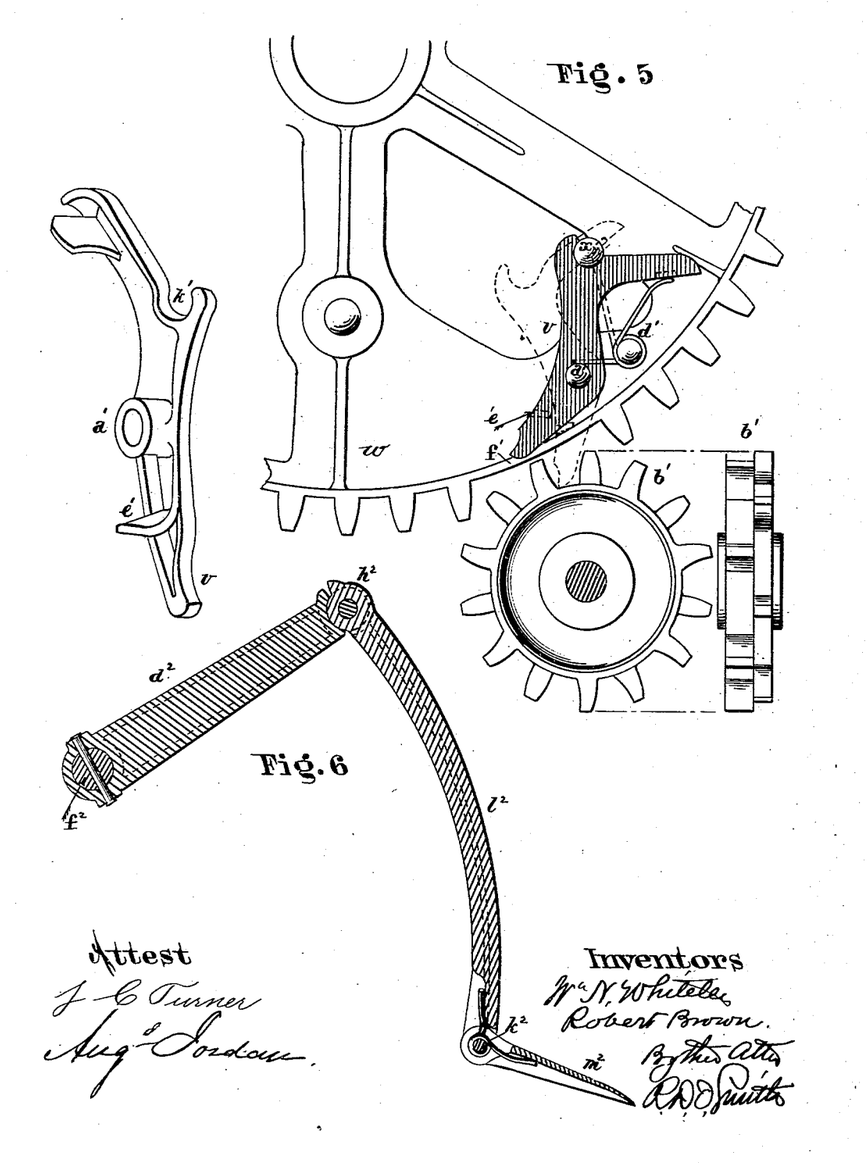
Fig. 6 is a sectional elevation of one of the ejecting-arms.
Figure 7:
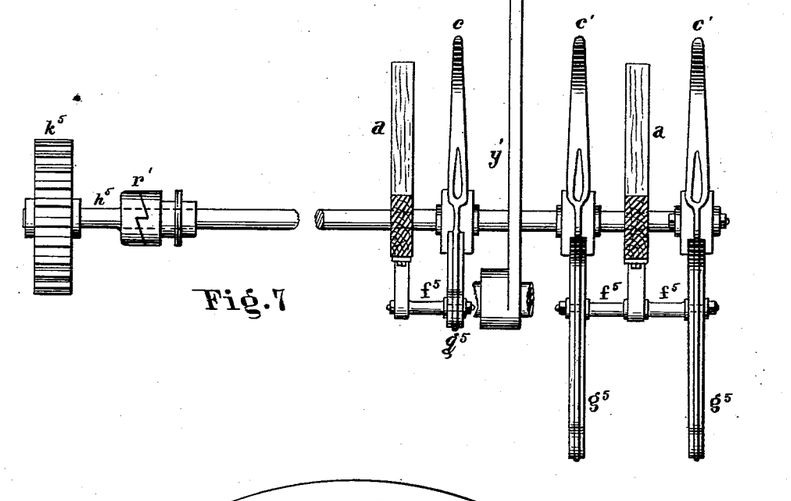
Fig. 7 is a longitudinal elevation of the packing-arms and their driving mechanism.
Figure 8:
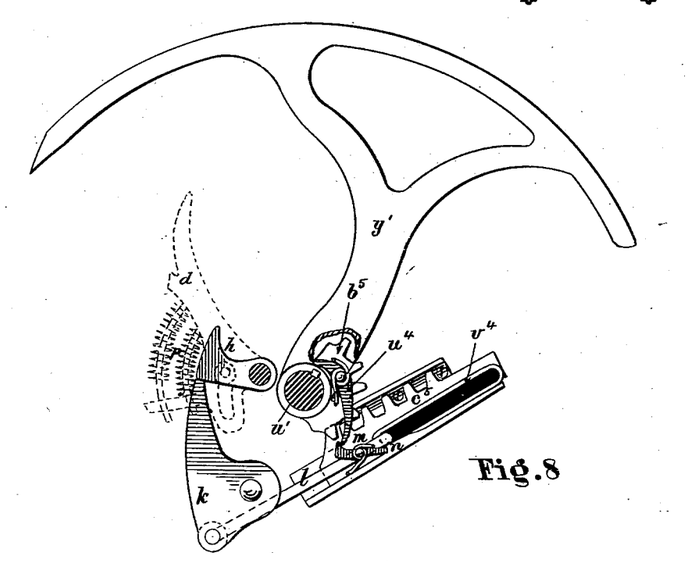
Fig. 8 is a partial sectional elevation of the mechanism used to actuate the compress-arms, and through them the self-starting mechanism.

The knotter shaft $b^6$ is journaled in bearings $c^6$ and $d^6$, the bearing $d^6$ being attached to a metal bridge, $e^6$, that is secured to the main frame $a$ in the manner shown by Fig. 2 of the drawings.

Having thus described our invention, what we claim as new, and desire to secure by Letters Patent, is—

1. A flexible ejector composed of the arm $d^2$, mounted upon and actuated by the rock-shaft $f^2$, and the sections $l^2 m^2$, jointed at $h^2 k^2$, whereby said ejector is enabled to pass uninterruptedly over the grain about to be bound.

2. A flexible ejector composed of sections $d^2$, $l^2$, and $m^2$, jointed at $h^2$ and $k^2$, combined with an expanding spring in joint $k^2$, whereby the part $m^2$ is moved to a position almost at right angles to the part $l^2$.

3. A looping-hook, $p^2$, a rotating tube, $e^3$, on which said hook is carried and adapted to reciprocate, and the pinion $f^3$, attached to said tube, combined with a gear-wheel, $n^3$, having gear-segments and delay-surfaces in engagement with said pinion during one continuous revolution of said wheel, said pinion and the looping-hook making one revolution, and a part of another, and then rest for a period, and then complete the second revolution and rest, as set forth.

4. A clutch device consisting of a pivoted tooth, $v$, carried by a wheel, $w$, having a gap in its teeth, a movable pin, $x$, on the frame, a pinion, $b'$, a slotted lever, $u$, engaging the pin $x$ at one end and provided with a spring, $a^5$, in combination with the cam-plate $r$ of a shaft that is rocked by the accumulation of grain acting against a trip-arm on the said shaft, for the purpose specified.

5. A rock-shaft, $u'$, carrying a loosely-sleeved trip-arm, $d$, that has a spring, $p$, interposed between it and an extension, $g$, fast on the shaft, in combination with an arm, $h$, also fast on the shaft, bell-crank $k$, pivoted on the frame-rod $l$, slotted rack $c^5$, curved rack $b^5$, and a spring-latch, $m$, resting against a stationary projection, $n$, and liberated by a spring-lever, $u^4$, substantially as and for the purpose specified.

6. A rock-shaft, $u'$, carrying a trip-arm, $d$, mechanism for operating the same, and levers $m^5$, provided with pivoted grain-retaining fingers $l^5$, the lower ends of which work through holes formed in lugs secured to the frame $n^5$, substantially as and for the purpose specified.

7. In a grain-binding machine, the combination, with the packers $c'$ $c'$, of a trip-arm, substantially such as specified, and the ejectors composed of the sections $d^2$ $l^2$ $m^2$, arranged upon a rock-shaft located above the binding-receptacle, and the mechanism for operating the same, substantially as and for the purpose specified.

In testimony whereof we have hereunto set our hands this 29th day of October, 1881.

WILLIAM N. WHITELEY.
   ROBERT BROWN.

Witnesses:
 HENRY MILLWARD,
 AUGUSTUS N. SUMMERS,
 E. O. BOWMAN.